United States Patent
Burkman

(10) Patent No.: US 9,853,435 B1
(45) Date of Patent: Dec. 26, 2017

(54) BUSBAR THERMAL MANAGEMENT ASSEMBLY AND METHOD

(71) Applicant: FORD GLOBAL TECHNOLOGIES, LLC, Dearborn, MI (US)

(72) Inventor: Wesley Edward Burkman, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/250,195

(22) Filed: Aug. 29, 2016

(51) Int. Cl.
- *H02G 5/10* (2006.01)
- *H02G 5/00* (2006.01)
- *H01M 2/10* (2006.01)
- *H01M 2/30* (2006.01)

(52) U.S. Cl.
CPC ............ *H02G 5/10* (2013.01); *H01M 2/1077* (2013.01); *H01M 2/305* (2013.01); *H02G 5/005* (2013.01)

(58) Field of Classification Search
CPC ........... H01M 2/1077; H01M 2220/20; H01M 2/305; H01M 10/613; H01M 2/202; H01M 10/625; H01M 10/425; H01M 10/0413; H01M 10/6555; H02G 5/005; H02G 5/06; H02G 5/007; H02G 5/08; H02G 5/10; H02G 5/00; H02G 5/002
See application file for complete search history.

(56) References Cited

U.S. PATENT DOCUMENTS

| | | | | |
|---|---|---|---|---|
| 3,189,680 A | * | 6/1965 | Stanback | H02G 5/007 174/88 B |
| 3,339,009 A | * | 8/1967 | Davis | H02G 5/007 174/72 B |
| RE26,310 E | * | 11/1967 | Moodie | H02G 5/007 174/16.2 |
| 3,459,874 A | * | 8/1969 | Fouse | H02G 5/007 174/68.2 |
| 3,609,215 A | * | 9/1971 | Giger, Jr. | H02G 5/002 174/84 S |
| 3,726,988 A | * | 4/1973 | Davis | H02G 5/06 174/117 FF |
| 5,760,339 A | * | 6/1998 | Faulkner | H01R 25/162 174/88 B |

(Continued)

FOREIGN PATENT DOCUMENTS

CN 2012204069 3/2009

OTHER PUBLICATIONS

Csanyi, Copper or Aluminum? Which to use and when? Retrieved Jun. 3, 2016 from http://electrical-engineering-portal.com/copper-or-aluminium.

(Continued)

*Primary Examiner* — Adam B Dravininkas
(74) *Attorney, Agent, or Firm* — Carlson, Gaskey & Olds, P.C.

(57) ABSTRACT

An exemplary busbar assembly includes a first layer, and a second layer having a portion that contacts the first layer and a portion that is spaced from the first layer to provide an opening between the first layer and the second layer. An exemplary method of managing thermal energy includes contacting a first layer and a second layer in a first area of a busbar, and separating, in a second area of the busbar, the first layer from the second layer to provide an opening between the first layer and the second layer.

11 Claims, 3 Drawing Sheets

(56) References Cited

U.S. PATENT DOCUMENTS

| | | | | |
|---|---|---|---|---|
| 5,828,006 A | * | 10/1998 | Graham | H02G 5/06 |
| | | | | 174/99 R |
| 5,854,445 A | * | 12/1998 | Graham | H02G 5/007 |
| | | | | 174/133 B |
| 5,866,850 A | | 2/1999 | Kobayashi | |
| 6,472,606 B2 | * | 10/2002 | Yamakawa | H01R 9/24 |
| | | | | 174/149 B |
| 6,538,203 B1 | | 3/2003 | Nölle et al. | |
| 7,413,489 B1 | | 8/2008 | La Salvia et al. | |
| 7,952,875 B2 | | 5/2011 | Woody et al. | |
| 9,083,128 B2 | | 7/2015 | Pfeuffer et al. | |
| 9,287,547 B2 | | 3/2016 | Widhalm | |
| 2010/0319958 A1 | * | 12/2010 | Latimer | H02G 5/005 |
| | | | | 174/110 D |
| 2011/0159350 A1 | * | 6/2011 | Ochi | H01M 2/1077 |
| | | | | 429/159 |
| 2013/0003265 A1 | * | 1/2013 | Rodrigues | H02G 5/10 |
| | | | | 361/675 |

OTHER PUBLICATIONS

U.S. Appl. No. 15/216,111, filed Jul. 21, 2016.

* cited by examiner

BUSBAR THERMAL MANAGEMENT ASSEMBLY AND METHOD

TECHNICAL FIELD

This disclosure relates generally to a busbar for an electrified vehicle and, more particularly, to a flexible busbar having multiple layers. In some areas of the busbar, the layers are separated from each other to provide openings.

BACKGROUND

Electrified vehicles differ from conventional motor vehicles because electrified vehicles are selectively driven using one or more electric machines powered by a battery pack. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

A battery pack of an electrified vehicle can include a plurality of battery cell assemblies arranged in one or more battery arrays. Busbars can be used to distribute power to and from the battery cell assemblies, and to and from the battery pack. Some busbars are flexible busbars that include multiple individual layers stacked on top of one another.

SUMMARY

A busbar assembly, according to an exemplary aspect of the present disclosure includes, among other things, a first layer and a second layer. The second layer has a portion that contacts the first layer, and a portion that is spaced from the first layer to provide an opening between the first layer and the second layer.

In a further non-limiting embodiment of the foregoing busbar assembly, the first layer and the second layer extend along an axis. The portion that is spaced from the first layer is spaced radially from the first layer relative to the axis.

In a further non-limiting embodiment of any of the foregoing busbar assemblies, an axial section of the first layer and an axial section of the second layer each have a rectangular profile.

A further non-limiting embodiment of any of the foregoing busbar assemblies includes an insulating coating covering the first layer and the second layer where the portion of the second layer contacts the first layer.

A further non-limiting embodiment of any of the foregoing busbar assemblies includes a plurality of third layers. Each of the third layers has a portion that contacts another one of the third layers or the second layer. Each of the third layers having a portion that is spaced from the other third layers to provide an opening between each of the third layers and the other third layers. Each of the third layers having a portion that is spaced from the second layer to provide an opening between the third layers and the second layer.

In a further non-limiting embodiment of any of the foregoing busbar assemblies, the first layer and the second layer are portions of a flexible busbar assembly.

A further non-limiting embodiment of any of the foregoing busbar assemblies includes a spacer between the first layer and the second layer. The spacer blocks the portion of the second layer that is spaced from the first layer from moving toward the first layer.

A further non-limiting embodiment of any of the foregoing busbar assemblies includes a component secured to the first layer and the second layer.

In a further non-limiting embodiment of any of the foregoing busbar assemblies, the component is a relay.

In a further non-limiting embodiment of any of the foregoing busbar assemblies, the component is an electrified vehicle powertrain component.

In a further non-limiting embodiment of any of the foregoing busbar assemblies, the component is a first component secured to the first layer and the second layer at a first position. The assembly further includes a second component secured to the first layer and the second layer at a second position. The first position is between the second position and the portion that is spaced from the first layer to provide an opening.

A further non-limiting embodiment of any of the foregoing busbar assemblies includes a fluid movement device that moves a fluid through the opening.

A further non-limiting embodiment of any of the foregoing busbar assemblies includes a thermal exchange plate. The portion that is spaced from the first layer is potted to the thermal exchange plate.

A method of managing thermal energy according to another exemplary aspect of the present disclosure includes, among other things, contacting a first layer and a second layer in a first area of a busbar, and separating, in a second area of the busbar, the first layer from the second layer to provide an opening between the first layer and the second layer.

Another example of the foregoing method includes moving a flow of air through the opening to cool the busbar.

Another example of any of the foregoing methods includes securing respective first portions of the first and second layers to a first component, and securing respective second portions of the first and second layers to a second component.

In another example of any of the foregoing methods, the second area is between the first portions and the second portions.

In another example of any of the foregoing methods, the first portions are between the second area and the second portions.

Another example of any of the foregoing methods includes moving a flow of air through the opening to cool the first component, the second component, or both.

Another example of any of the foregoing methods includes resisting closure of the opening with a spacer positioned within a portion of the opening.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to a busbar of an electrified vehicle. The busbar includes multiple layers. The busbar can be flexed and bent to accommodate positioning in various configurations within the electrified vehicle. In some areas, the layers of the busbar are spaced from each other to provide an opening, to facilitate an exchange of thermal energy between the busbar and the surrounding environment.

Figure 1:
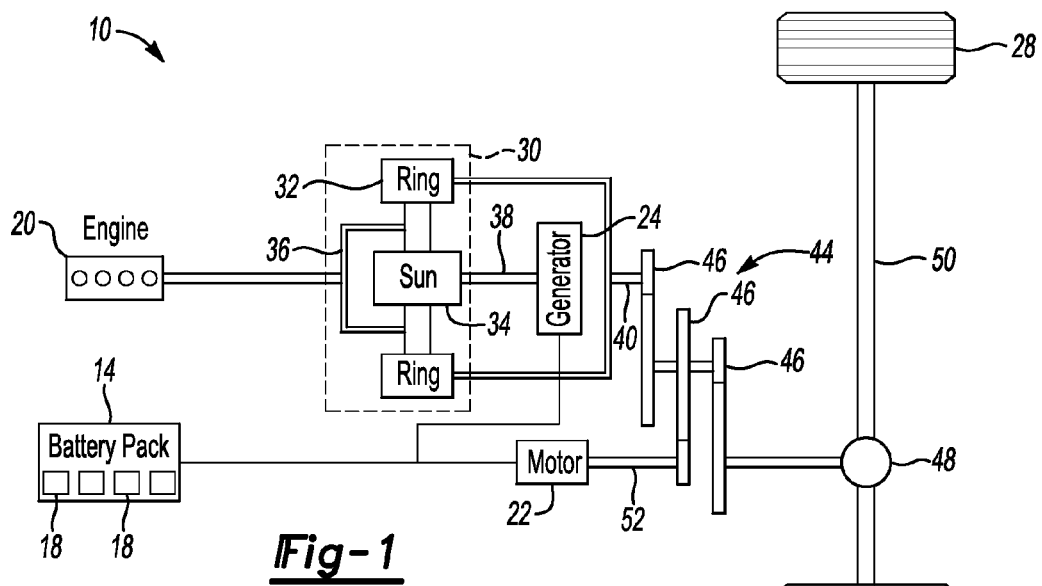
FIG. 1 illustrates a schematic view of an example powertrain of an electrified vehicle.

Referring to FIG. 1, a powertrain 10 of a hybrid electric vehicle (HEV) includes a battery pack 14 having a plurality of battery arrays 18, an internal combustion engine 20, a motor 22, and a generator 24. The motor 22 and the generator 24 are types of electric machines. The motor 22 and generator 24 may be separate or have the form of a combined motor-generator.

In this embodiment, the powertrain 10 is a power-split powertrain that employs a first drive system and a second drive system. The first and second drive systems generate torque to drive one or more sets of vehicle drive wheels 28. The first drive system includes a combination of the engine 20 and the generator 24. The second drive system includes at least the motor 22, the generator 24, and the battery pack 14. The motor 22 and the generator 24 are portions of an electric drive system of the powertrain 10.

The engine 20 and the generator 24 can be connected through a power transfer unit 30, such as a planetary gear set. Of course, other types of power transfer units, including other gear sets and transmissions, can be used to connect the engine 20 to the generator 24. In one non-limiting embodiment, the power transfer unit 30 is a planetary gear set that includes a ring gear 32, a sun gear 34, and a carrier assembly 36.

The generator 24 can be driven by the engine 20 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 can be selectively employed to drive the vehicle drive wheels 28 by outputting torque to a shaft 52 that is also connected to the second power transfer unit 44. In this embodiment, the motor 22 and the generator 24 cooperate as part of a regenerative braking system in which both the motor 22 and the generator 24 can be employed as motors to output torque. For example, the motor 22 and the generator 24 can each output electrical power to recharge cells of the battery pack 14.

Figure 2:
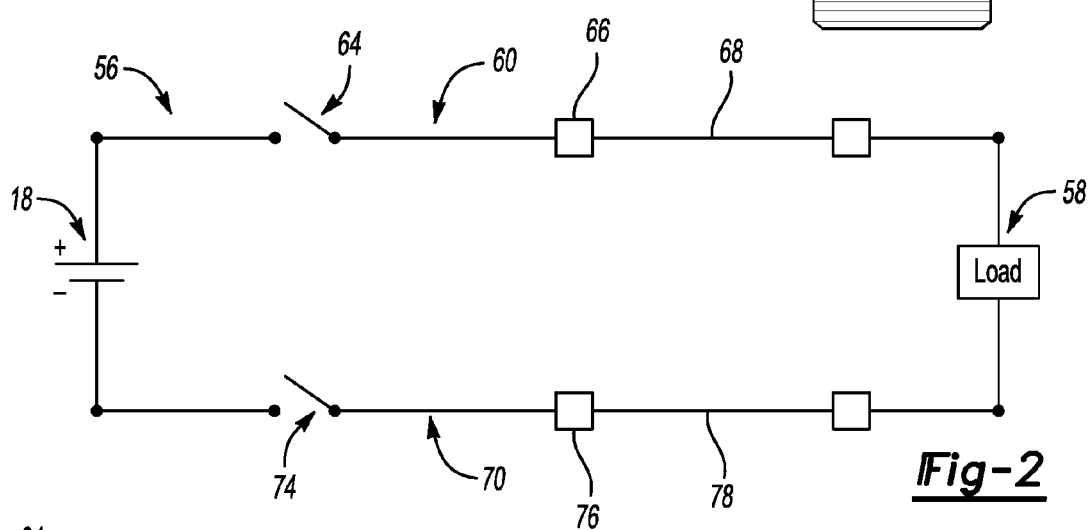
FIG. 2 illustrates an electronic distribution system used in the powertrain of FIG. 1.

Referring now to FIG. 2 with continuing reference to FIG. 1, an electronic distribution system 56 of the powertrain 10 is used to exchange electricity between the battery arrays 18 and a load 58, such as the motor 22.

The system 56 includes a busbar 60 that conducts electricity between a first component 64 and a second component 66. In this example, the first component 64 is a relay, and the second component 66 is a connector, such as a connector to a wiring harness 68.

The powertrain 10 includes another busbar 70 that is used to conduct electricity between a third component 74 and a fourth component 76. In this example, the third component 74 is a relay, and the fourth component 76 is a connector, such as a connector to a wiring harness 78.

Busbars could be used elsewhere within the system 56, such as between the wiring harness 68 and the load 58, or between the first component 64 and the battery arrays 18. Busbars could also be used elsewhere within the powertrain 10, in another portion of the vehicle incorporating the powertrain 10, or for some other application. The busbar of this disclosure should not be construed as limited to busbars positioned as shown in the system 56 of FIG. 2.

It may be desirable to maintain a temperature of the first component 64, a relay, within a particular temperature range. The components 64, 66, 74, 76, the busbars 60, 70 and other portions of the system 56 thus may benefit from being heated or cooled. In this example, the busbar 60 is configured to facilitate heating and cooling of the busbar 60, the first component 64, and the second component 66. In another example, the busbar 60 is configured to facilitate heating and cooling of just the busbar 60, or just one of the first component 64 or the second component 66.

Figure 3:
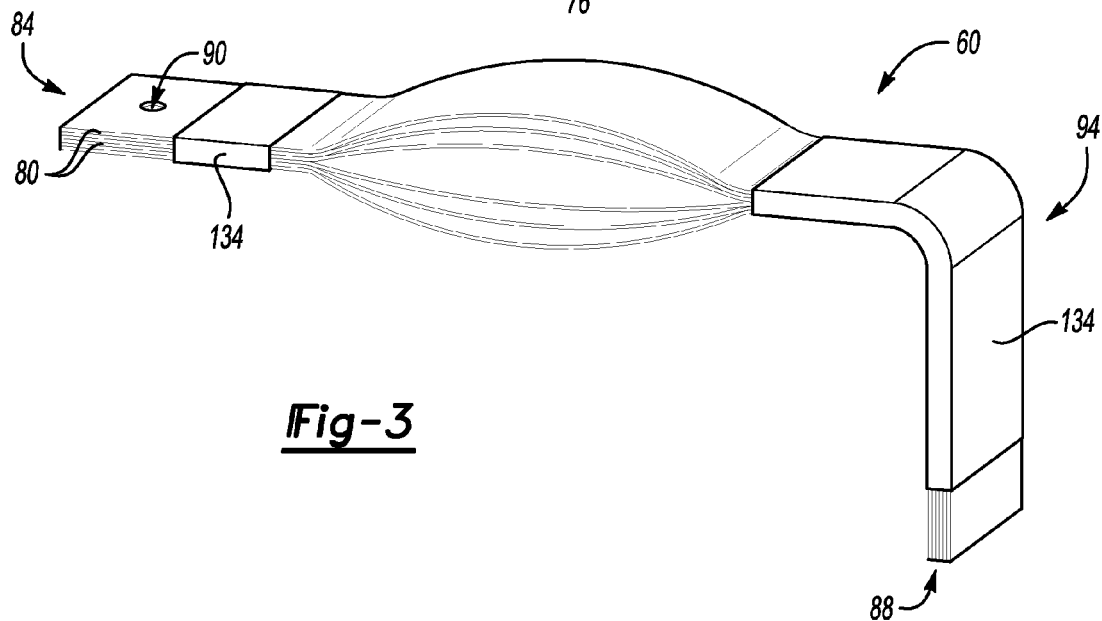
FIG. 3 illustrates a perspective view of a busbar from the electronic distribution system of FIG. 2.
Figure 4:
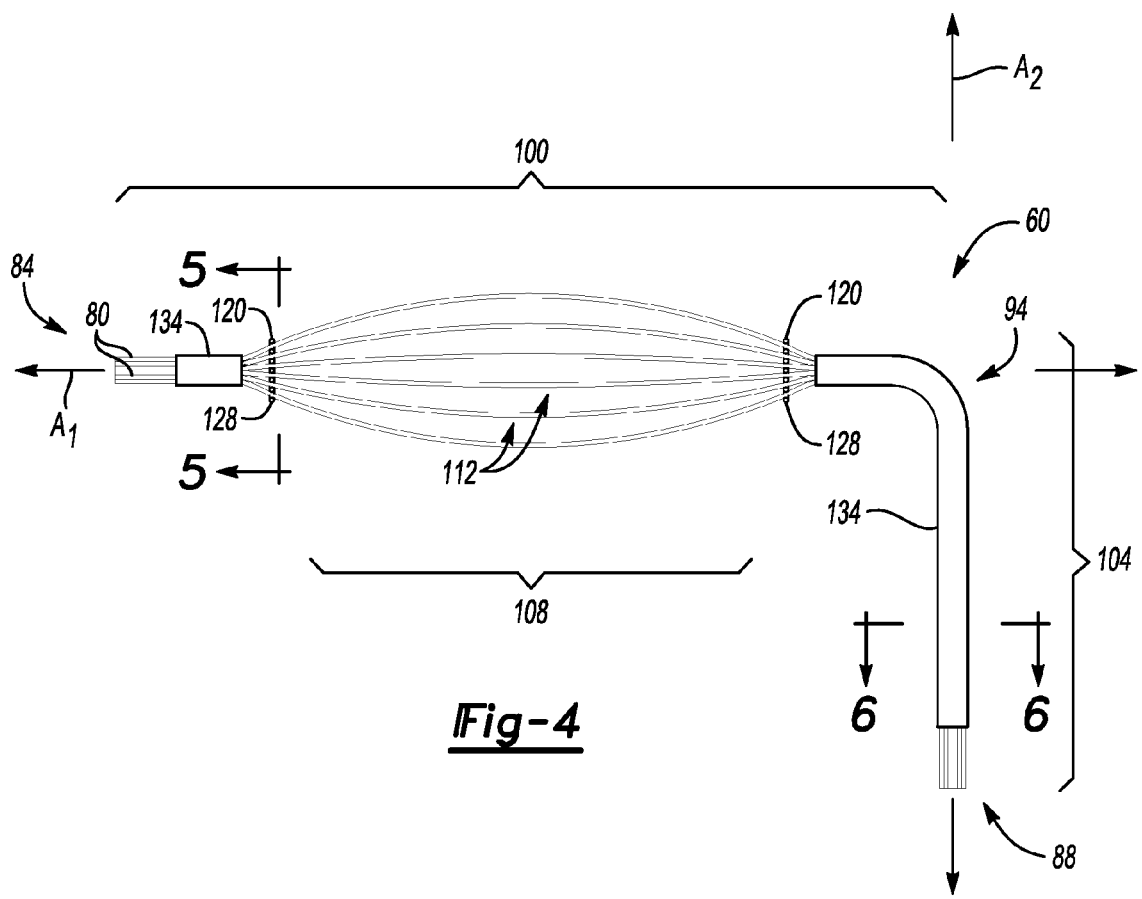
FIG. 4 illustrates a side view of the busbar of FIG. 3.

Referring to FIGS. 3 and 4 with continuing reference to FIG. 2, the busbar 60 is a flexible busbar having a plurality of layers 80. The busbar 60 extends from a first end 84 to an opposing, second end 88. The busbar 70 is configured similarly to the busbar 60.

In this example, the first end 84 of the busbar 60 is directly connected to the first component 64, and the second end 88 is directly connected to the second component 66. Threaded fasteners could extend through an aperture 90 to directly connect the first end 84 to the first component 64. The second end 88 could be clamped with the second component 66 to electrically couple the second end 88 and the second component 66. Other examples could utilize welds or crimps to connect the busbar 60 to components. Other examples could include electrically connecting the busbar 60 to the first component 64 and the second component 66 without directly connecting the busbar 60 to the first component 64 or the second component 66, such as through a wired connection between the busbar 60 and the first component 64 or the second component 66.

The busbar 60 includes a bend 94 through all the layers 80. Since the busbar 60 includes the bend 94, the busbar 60 extends nonlinearly from the first end 84 to the second end 88.

In other examples, the busbar 60 could include more than one bend. In still other examples, the busbar 60 could include no bends such that the busbar 60 extends linearly from the first end 84 to the second end 88.

The bend 94 can be required to place the first end 84 and the second end 88 in positions appropriate for connecting to the first component 64 and the second component 66. Bending the busbar 60 can also be required to meet packaging requirements.

The busbar 60 includes six layers 80 in this example. The layered structure can facilitate forming the bend 94. The layers 80 have a rectangular axial cross-section in this example. Other examples could include layers with other axial cross-sections.

A first section 100 of the busbar 60 extends along a first axis $A_1$ from the first end 84 to the bend 94. A second section 104 of the busbar 60 extends along a second axis $A_2$ from the bend 94 to the second end 88. The first axis $A_1$ is transverse to the second axis $A_2$.

Figure 5:
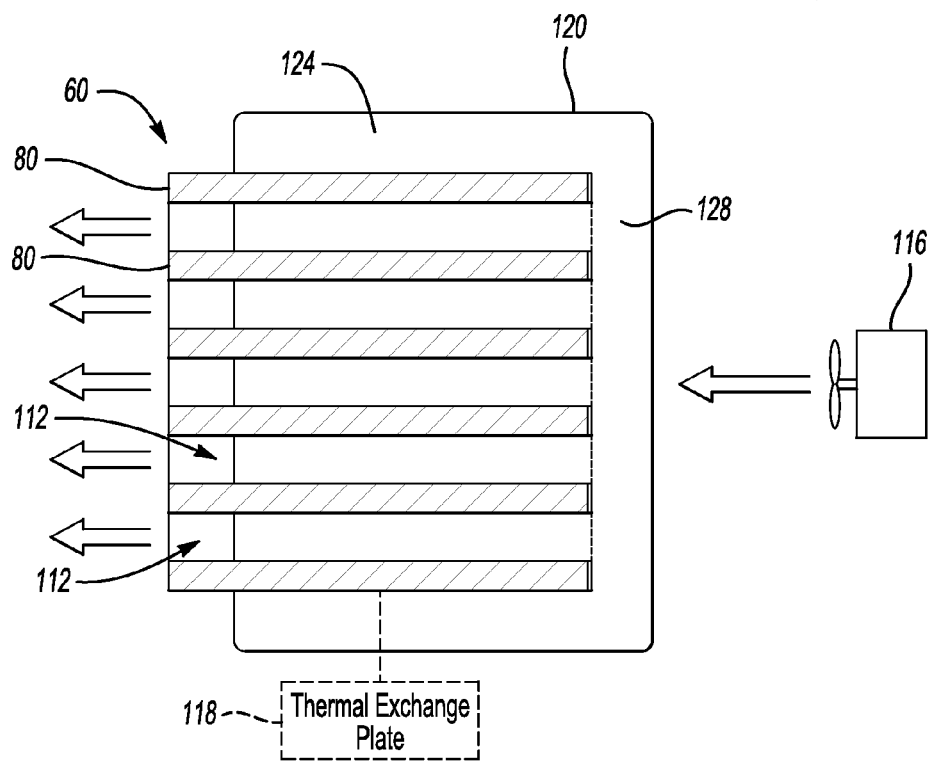
FIG. 5 illustrates a section view at line 5-5 in FIG. 4.
Figure 6:
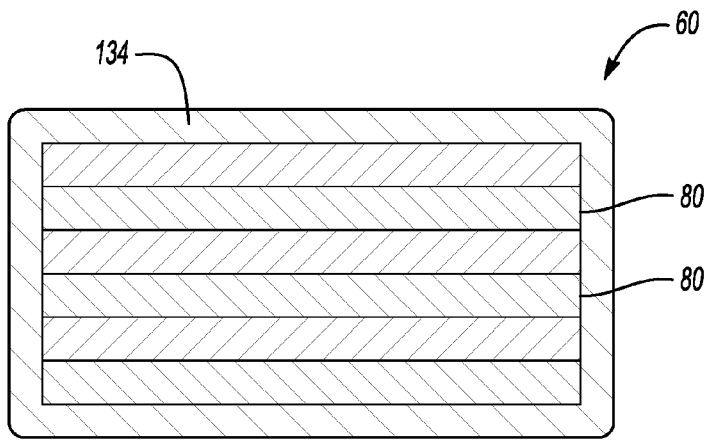
FIG. 6 illustrates a section view at line 6-6 in FIG. 4.

Referring now to FIGS. 5 and 6 with continuing reference to FIGS. 3 and 4, the first section 100 includes an area 108 wherein the layers 80 are separated from each other to provide a plurality of openings 112. In this example, the layers 80 are spaced radially relative to the axis $A_1$. Each of the layers 80 is spaced from each of the other layers 80 in this example.

In other examples, other numbers of the layers 80 could be spaced from each other. For example, three layers 80 that are directly contacting each other could be spaced from three other layers 80 directly contacting each other. Spacing the three layers 80 from the other three layers 80 could provide a single opening in the busbar 60.

In the remaining areas of the first section 100, the layers 80 are in direct contact with each other, such that there are no openings between the layers 80. In the second section 104, the layers 80 are also in direct contact with each other, such that there are no openings between the layers 80 within the second section 104.

Due to the openings 112, the area 108 includes more exposed surfaces of the layers 80 than the other portions of the busbar 60. The exposed surfaces can facilitate thermal energy exchange between the busbar 60 and the surrounding environment. The exposed surfaces of the layers 80 act as cooling fins in this example.

In some examples, the busbar 60 with the area 108 having the openings 112 cools more quickly in a given environment than a busbar lacking an area where layers are separated from each other to provide openings.

Cooling the busbar 60 more quickly can also speed up cooling of components that are directly connected, or just thermally connected, to the busbar 60. That is, the busbar 60, which is cooling more quickly due to the exposed surface area, can draw heat away from the components connected to the busbar 60.

In some examples, the busbar 60 with the area 108 having the openings 112 results in the first component 64 cooling more quickly in a given environment than if the first component 64 were coupled to a busbar lacking an area where layers 80 are separated from each other to provide openings.

In some examples, a fluid movement device 116, such as a fan, can be positioned adjacent the area 108 to drive a flow of air through the openings 112. Moving more air through the openings 112 can further enhance cooling.

In some examples, the layers 80 of the busbar 60 in the area 108 could be thermally potted to a thermal exchange plate 118 (shown in broken lines in FIG. 5) separate from the busbar 60. Fluid could move through the thermal exchange plate to exchange thermal energy with the area 108 of the busbar 60. The thermal exchange plate option could provide increased conduction over examples relying on the flow of air.

In this example, the area 108 is positioned between where the busbar 60 attaches to the first component 64 and the second component 66 (FIG. 2). Other examples could position the area 108 elsewhere.

Figure 7:
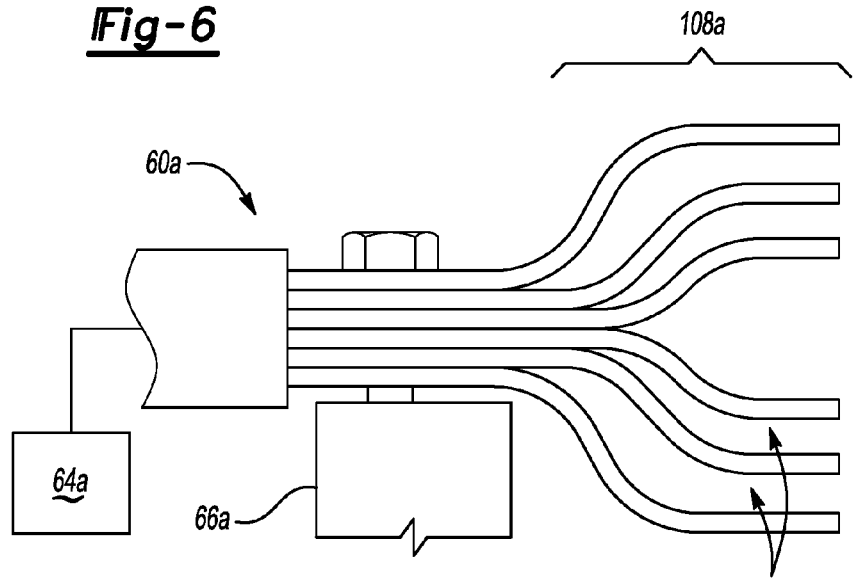
FIG. 7 illustrates a side view of a portion of a busbar according to another exemplary embodiment.

As shown in FIG. 7, in another example a busbar 60a includes an area 108a with openings 112a positioned on a first side of a connection to a component 66a, and the same busbar 60a extends from another side of the component 66a to electrically connect to another component 64a. A position where the busbar 60a is secured to the component 66a is thus between the area 108a and a position where the busbar 60a is secured to the component 64a.

Referring again to the busbar 60 of FIGS. 2-6, the layers 80 are roll formed in this example. In the area that will correspond to the area 108 when the layers 80 are stacked to form the busbar 60, the layers 80 are formed to have a desired curve. The layers 80 that will be used on the top and bottom of the busbar 60 are formed with the most severe curve. The other layers 80 curve less, and the innermost layers 80 curve the least. Various machining process could be used to form desired curvatures in the layers 80.

Figure 8:
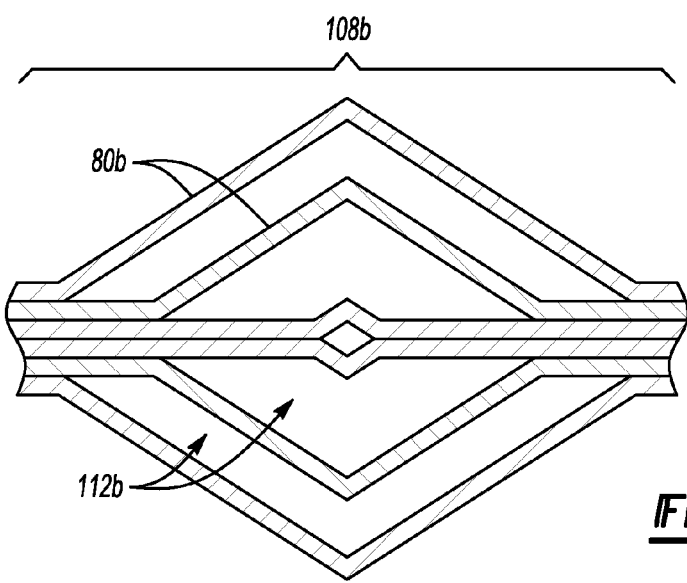
FIG. 8 illustrates a side view of a portion of a busbar according to yet another exemplary embodiment.

Other examples may form the layers 80 profiles other than curves into the layers 80 to provide a desired spacing between layers 80 in the area 108. For example, FIG. 8 shows an open area 108b with layers 80b bent to have a triangular profile to provide openings 112b.

As shown in FIGS. 4 and 5, to maintain the openings 112, the busbar 60 could be used in connection with a spacer 120. In this example, the spacer 120 includes a plurality of fingers 124 extending from a base 128. The fingers 124 extend into the openings 112 to block the layers 80 from moving radially toward each other. That is, the spacer 120 resists closure of the openings 112.

In the example busbar 60, some areas are covered with an insulating coating 134, which holds the individual layers 80 together and can also prevent inadvertent contact between those areas and another structure. The areas covered by the insulating coating 134 are areas where the layers 80 are in direct contact with each other. In this example, the areas where the layers 80 are spaced from each other do not include the insulating coating 134. In another example, the layers 80 are each individually coated with an insulating coating such that there is insulating coating between the layers 80 adjacent to each other within the area 108.

In the example busbar 60, the layers 80 are made of a single material, such as copper. In another example, portions of the layers 80 are made of a first material, like copper, and other portions of the layers 80 are made of a second different material, such as aluminum. Different materials may be used for weight reduction, for example.

To encourage thermal exchange, the layers 80 could include additional fins, ribs, or other features to further increase the amount of exposed surface area.

Features of the disclosed examples include increasing thermal energy exchange between a multilayered busbar and a surrounding environment by separating some of the layers to provide openings between the layers. The openings can further enhance thermal energy exchange if airflow is actively moved through the openings.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:
1. A busbar assembly, comprising:
a first layer;
a second layer having a first and a second contacting portion where the second layer contacts the first layer, and a spaced portion where the second layer is spaced from the first layer to provide an opening between the first layer and the second layer, the spaced portion disposed between the first and the second contact portions;

a first component secured to the first layer and the second layer at a first position; and a second component secured to the first layer and the second layer at a second position, wherein the portion that is spaced from the first layer to provide an opening is between the first and second position.

2. The busbar assembly of claim 1, wherein the first layer and the second layer extend continuously along an axis, and the spaced portion that is spaced from the first layer is spaced radially from the first layer relative to the axis.

3. The busbar assembly of claim 2, wherein an axial section of the first layer and an axial section of the second layer each have a rectangular profile.

4. The busbar assembly of claim 1, further comprising an insulating coating covering the first and second contacting portions.

5. The busbar assembly of claim 1, further comprising a plurality of third layers, each of the third layers having a first and a second contacting portion that contacts another one of the third layers or the second layer, each of the third layers having a spaced portion that is spaced from the other third layers to provide an opening between each of the third layers and the other third layers, each of the third layers having a spaced portion that is spaced from the second layer to provide an opening between the third layers and the second layer.

6. The busbar assembly of claim 1, wherein the first layer and the second layer are portions of a flexible busbar assembly.

7. The busbar assembly of claim 1, further comprising a spacer between the first layer and the second layer, the spacer blocking the spaced portion of the second layer from moving toward the first layer.

8. The busbar assembly of claim 1, wherein the component is a relay.

9. The busbar assembly of claim 1, wherein the component is an electrified vehicle powertrain component.

10. The busbar assembly of claim 1, further comprising a fluid movement device that moves a fluid through the opening.

11. The bus bar assembly of claim 1, further comprising a thermal exchange plate, wherein the portion that is spaced from the first layer is potted to the thermal exchange plate.

* * * * *